United States Patent
Tsunehara et al.

(10) Patent No.: US 8,451,774 B2
(45) Date of Patent: May 28, 2013

(54) COMMUNICATION SYSTEM AND GATEWAY APPARATUS

(75) Inventors: Katsuhiko Tsunehara, Hachioji (JP); Daisuke Matsubara, Tachikawa (JP); Seishi Hanaoka, Tokyo (JP); Masashi Yano, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 655 days.

(21) Appl. No.: 12/633,039

(22) Filed: Dec. 8, 2009

(65) Prior Publication Data

US 2010/0157898 A1 Jun. 24, 2010

(30) Foreign Application Priority Data

Dec. 24, 2008 (JP) .................................. 2008-327934

(51) Int. Cl.
*H04W 4/00* (2009.01)
*H04L 12/28* (2006.01)

(52) U.S. Cl.
USPC ............................ 370/328; 370/332; 370/401

(58) Field of Classification Search
None
See application file for complete search history.

(56) References Cited

U.S. PATENT DOCUMENTS

| | | | |
|---|---|---|---|
| 2003/0107991 A1* | 6/2003 | Tezuka et al. ................. | 370/229 |
| 2004/0122976 A1* | 6/2004 | Dutta et al. .................... | 709/245 |
| 2007/0030821 A1* | 2/2007 | Iwamura et al. .............. | 370/328 |
| 2009/0172184 A1* | 7/2009 | Wason et al. .................. | 709/234 |
| 2012/0072325 A1* | 3/2012 | Schluetter et al. .............. | 705/35 |

FOREIGN PATENT DOCUMENTS

| | | |
|---|---|---|
| JP | 2004-186843 | 7/2004 |
| JP | 2007-53548 A | 3/2007 |
| WO | 2005/027394 A1 | 3/2005 |

OTHER PUBLICATIONS

JP Office Action in JP Application No. 2008-327934, dated Jun. 12, 2012.

* cited by examiner

*Primary Examiner* — Jutai Kao
(74) *Attorney, Agent, or Firm* — Mattingly & Malur, PC

(57) ABSTRACT

To control the communication quality on the terminal basis without making the base station more complicated, it is provided a communication system, comprising at least one computer and a gateway that is connected to the at least one computer through a first network. The gateway is connected to at least one terminal through a second network. The at least one terminal performs communications with the at least one computer via the gateway. The gateway estimates quality of the communications between the gateway and the at least one computer in the first network; and determines a priority for the communications between the gateway and the at least one terminal in the second network according to the estimated quality of the communications in the first network.

14 Claims, 12 Drawing Sheets

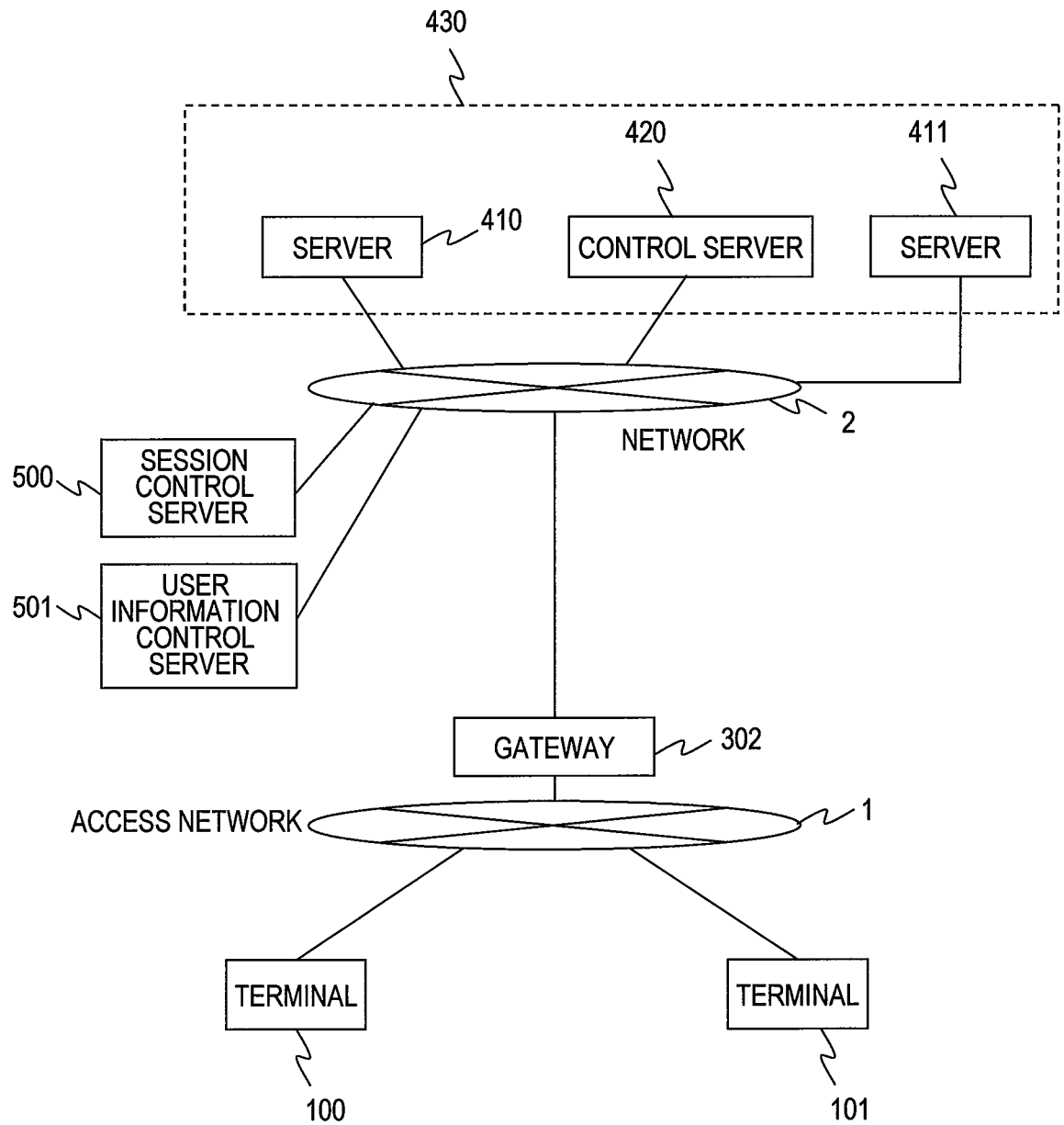
FIG. 1

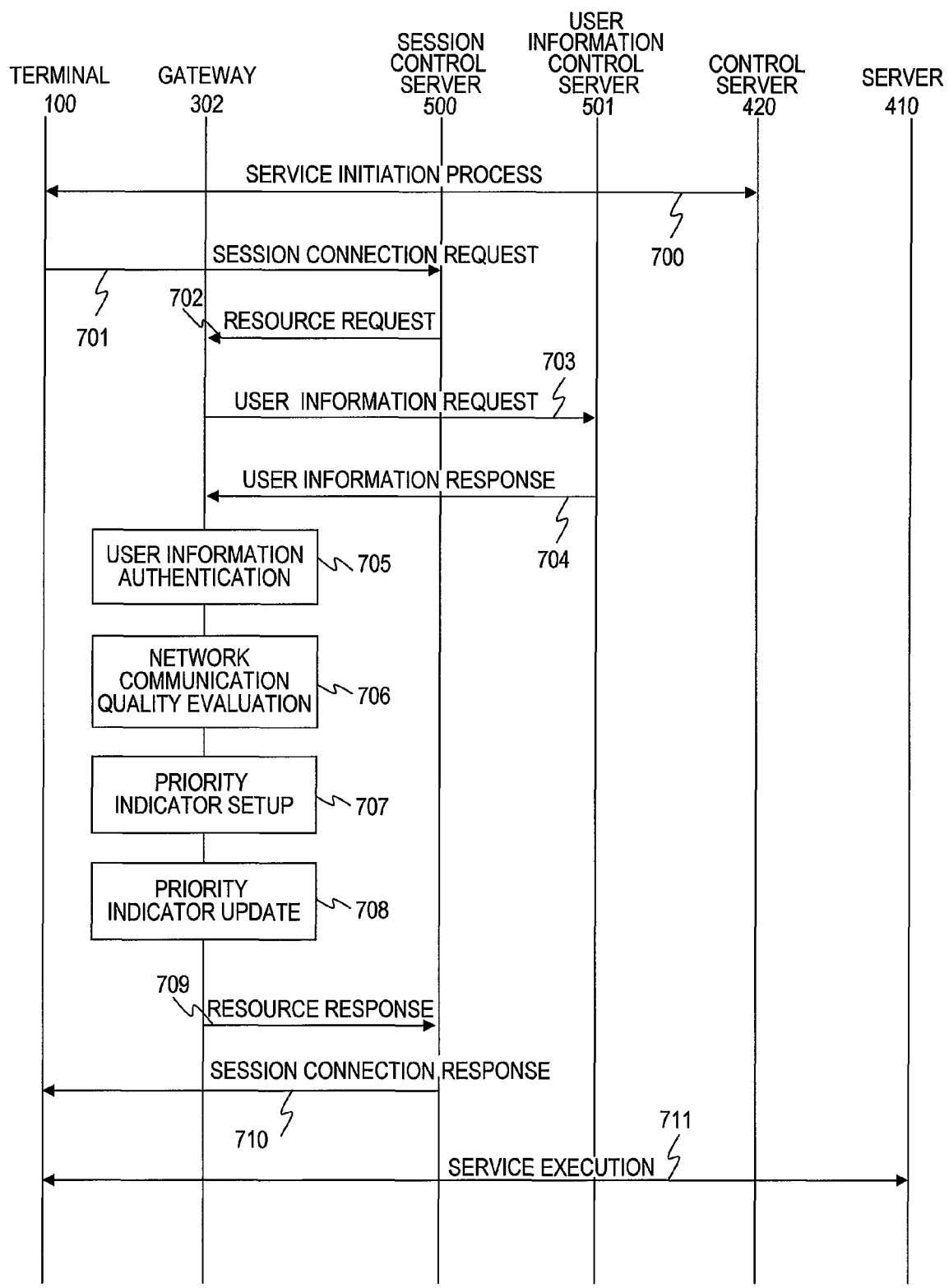
FIG. 2

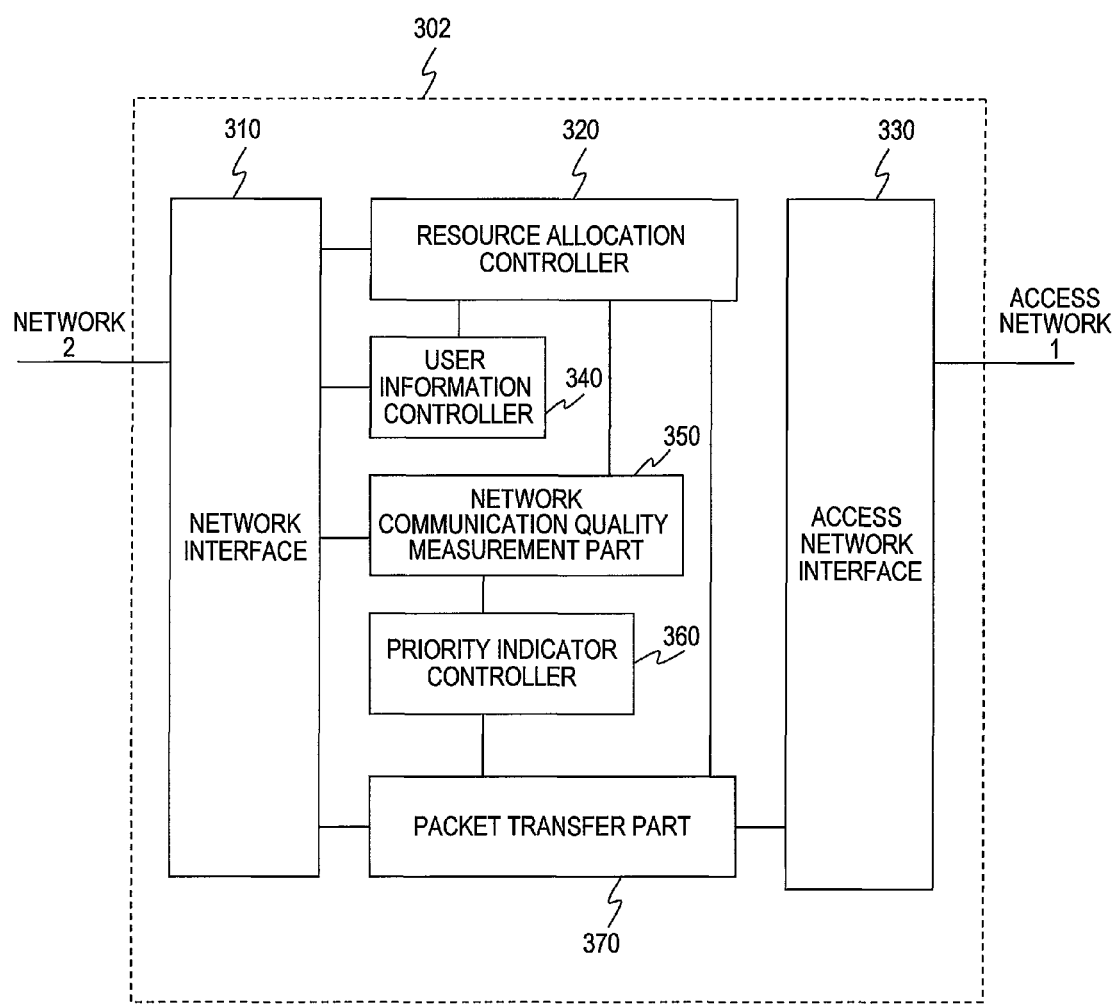
FIG. 3

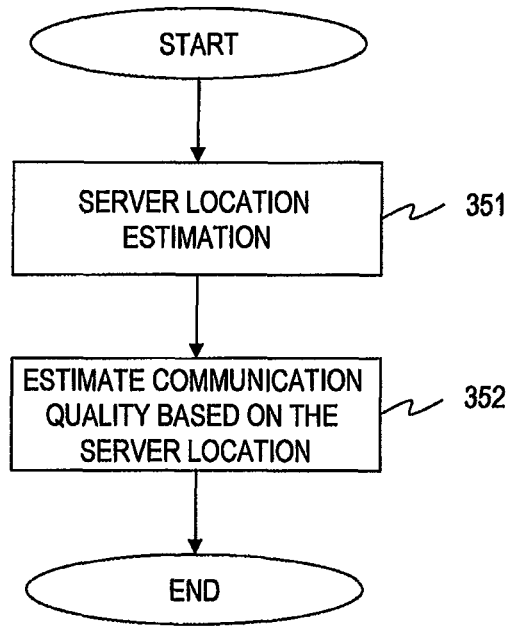
FIG. 4
| DISTANCE BETWEEN GATEWAY 302 AND THE CONNECTED SERVER | NETWORK COMMUNICATION QUALITY |
|---|---|
| DISTANCE < D1 | NQ1 |
| D1 ≤ DISTANCE < D2 | NQ2 |
| D2 ≤ DISTANCE < D3 | NQ3 |
| D3 ≤ DISTANCE | NQ4 |
FIG. 5

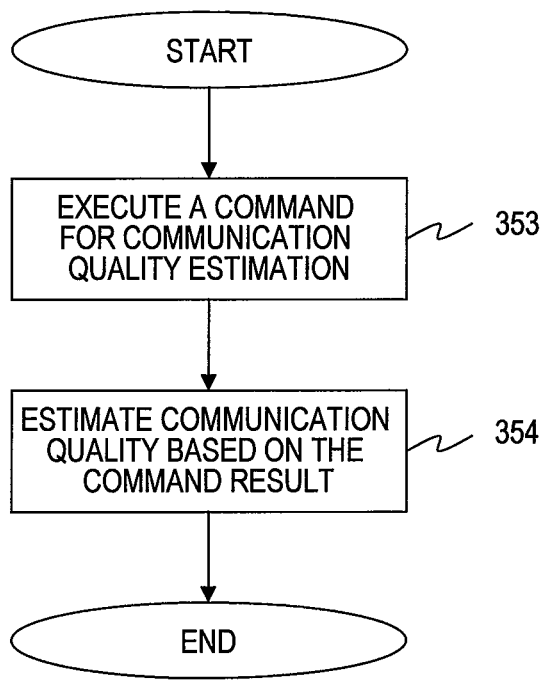
FIG. 6
| RESULT OF THE COMMAND | NETWORK COMMUNICATION QUALITY |
|---|---|
| RESULT < R1 | NQ1 |
| R1 ≤ RESULT < R2 | NQ2 |
| R2 ≤ RESULT < R3 | NQ3 |
| R3 ≤ RESULT | NQ4 |
FIG. 7

| NETWORK COMMUNICATION QUALITY | PRIORITY INDICATOR IN THE ACCESS NETWORK |
|---|---|
| NQ1 | AP1 |
| NQ2 | AP2 |
| NQ3 | AP3 |
| NQ4 | AP4 |

*FIG. 8*

| TERMINAL ID | SESSION ID | PRIORITY INDICATOR IN THE ACCESS NETWORK |
|---|---|---|
| U1 | S11 | AP11 |
|  | S12 | AP12 |
|  | : | : |
| U2 | S21 | AP21 |
|  | S22 | AP22 |
|  | : | : |
| : | : | : |

*FIG. 9*

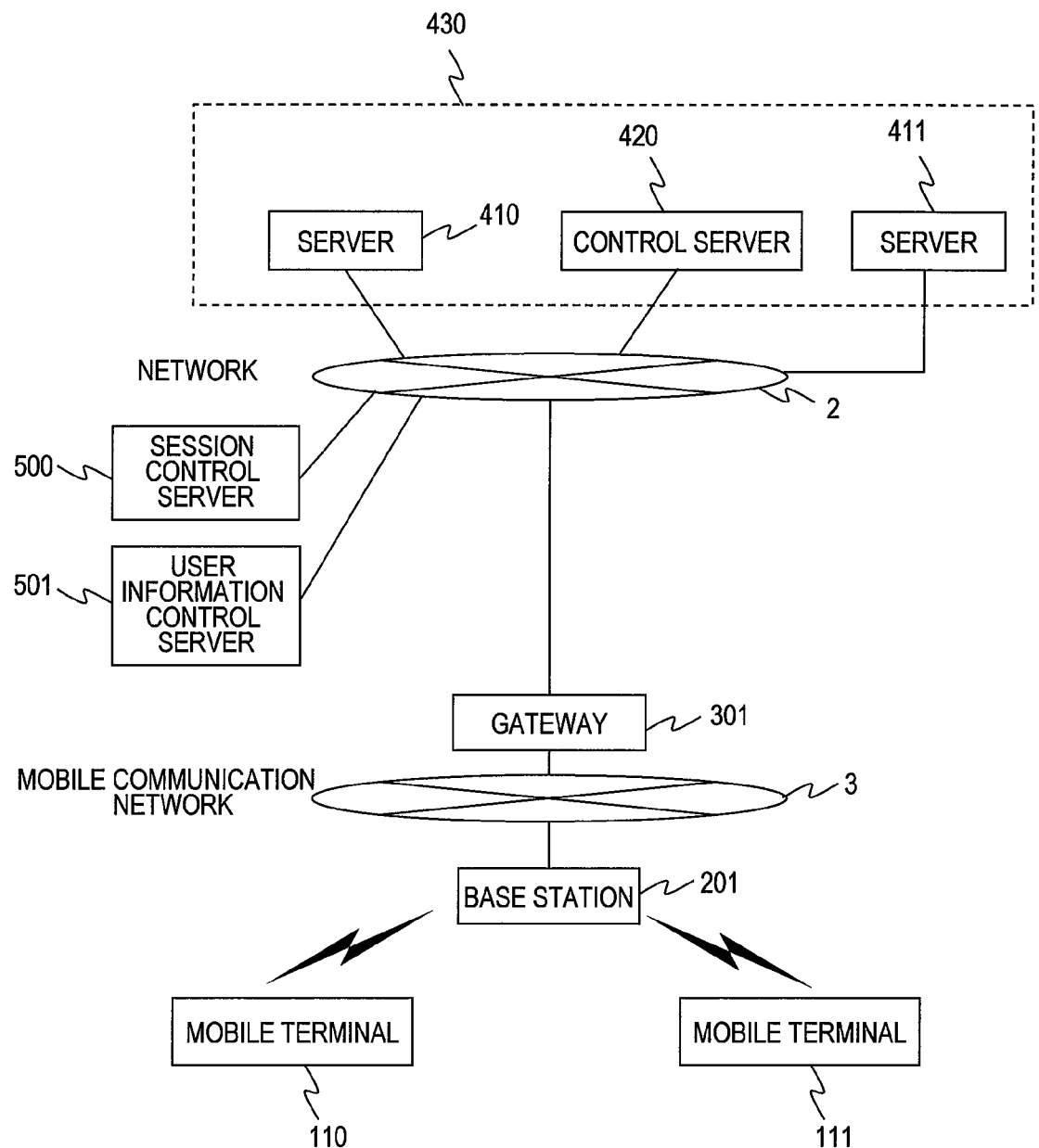
FIG. 10

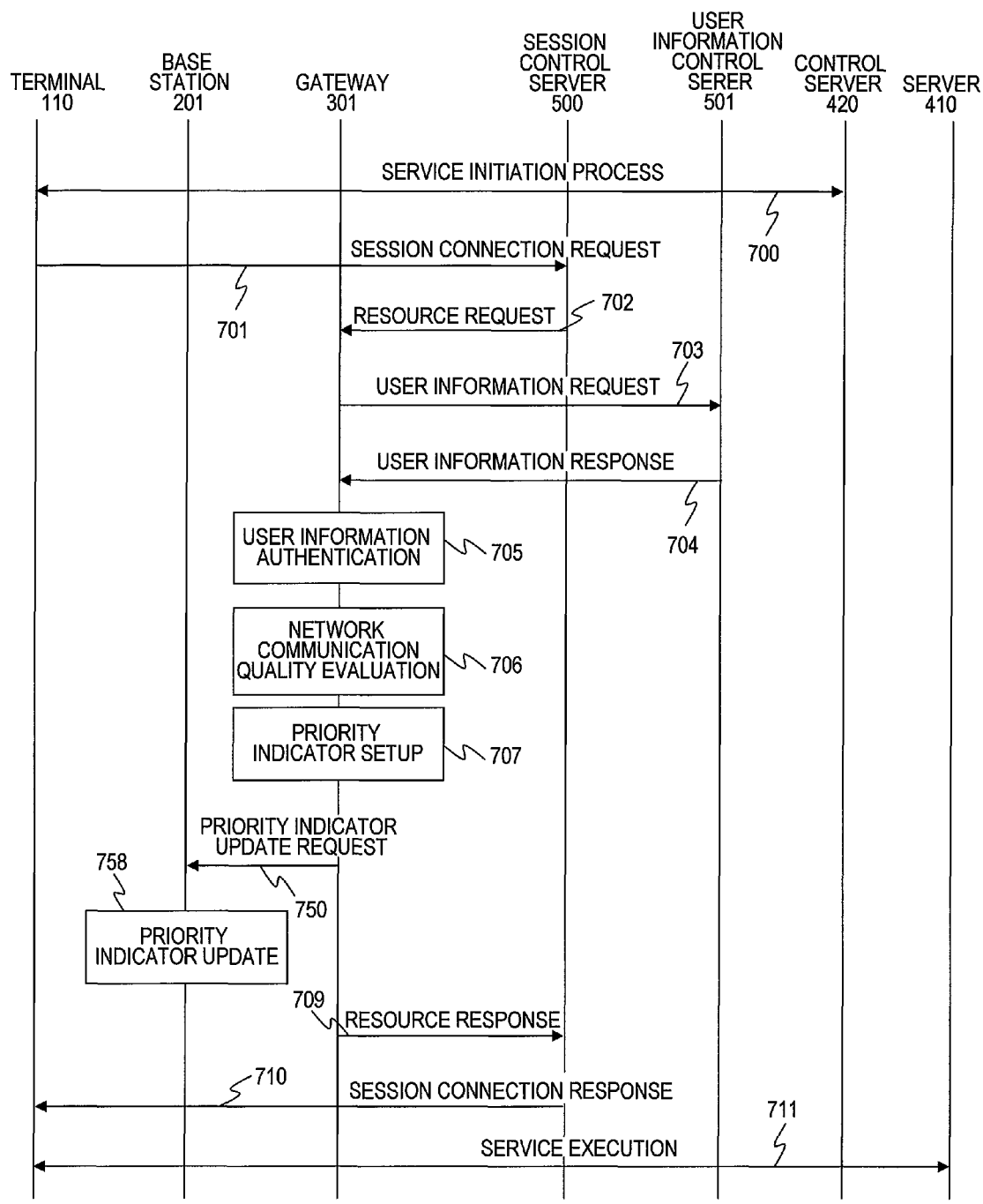
FIG. 11

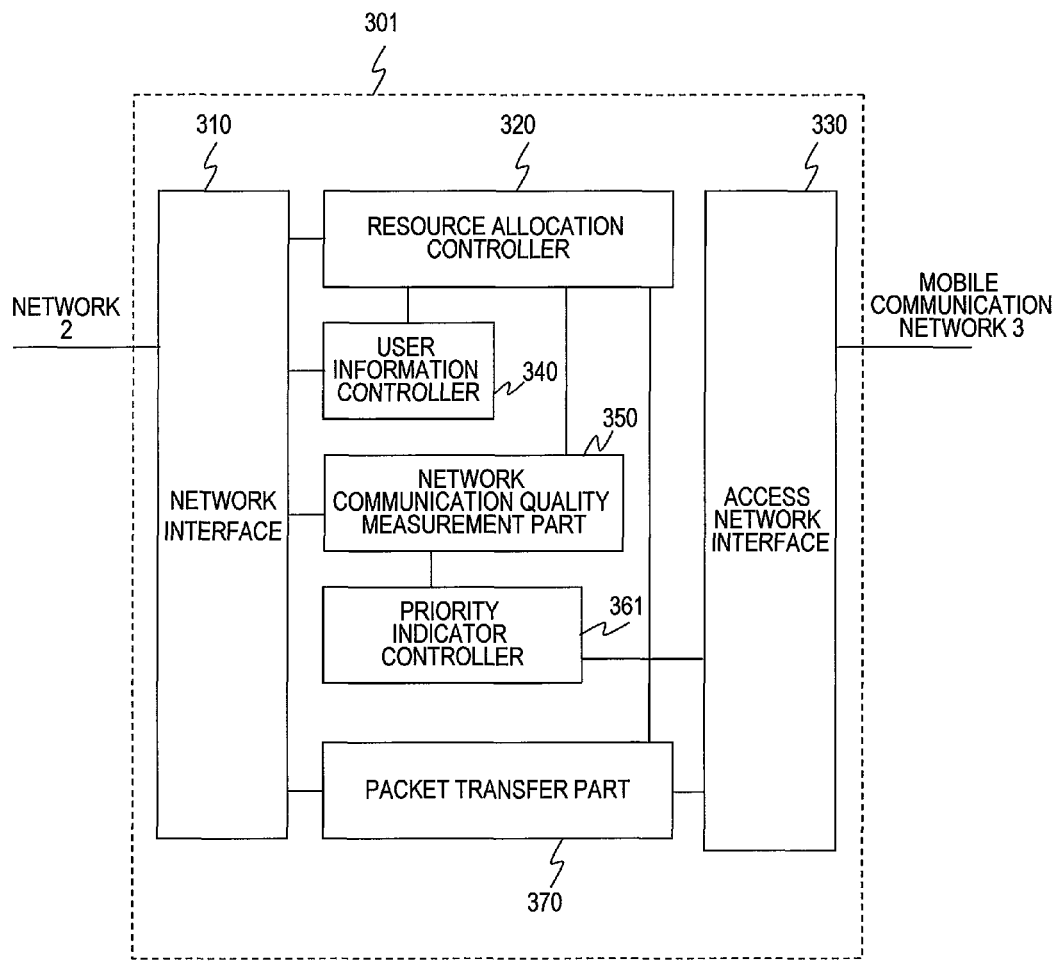
FIG. 12

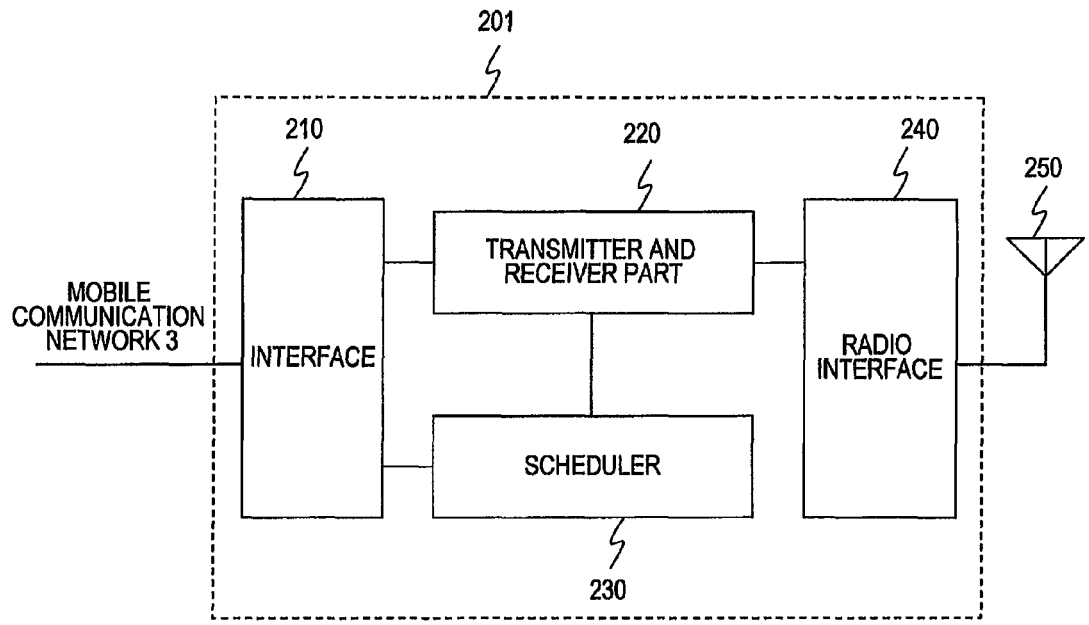
FIG. 13
| MOBILE TERMINAL ID | PRIORITY INDICATOR IN THE NETWORK 2 | PRIORITY INDICATOR IN THE WIRELESS ZONE |
|---|---|---|
| U1 | A | a1 |
| | B | a2 |
| | : | : |
| U2 | A | b1 |
| | B | b2 |
| | : | : |
| : | : | : |
FIG. 14

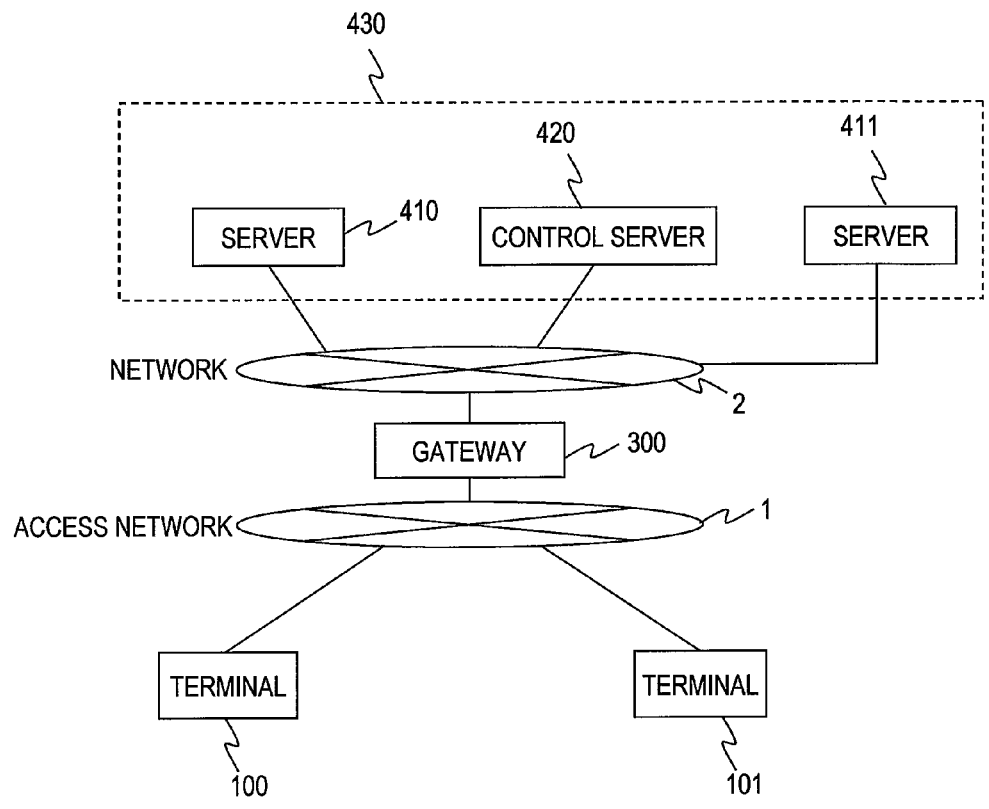
PRIOR ART
FIG. 15

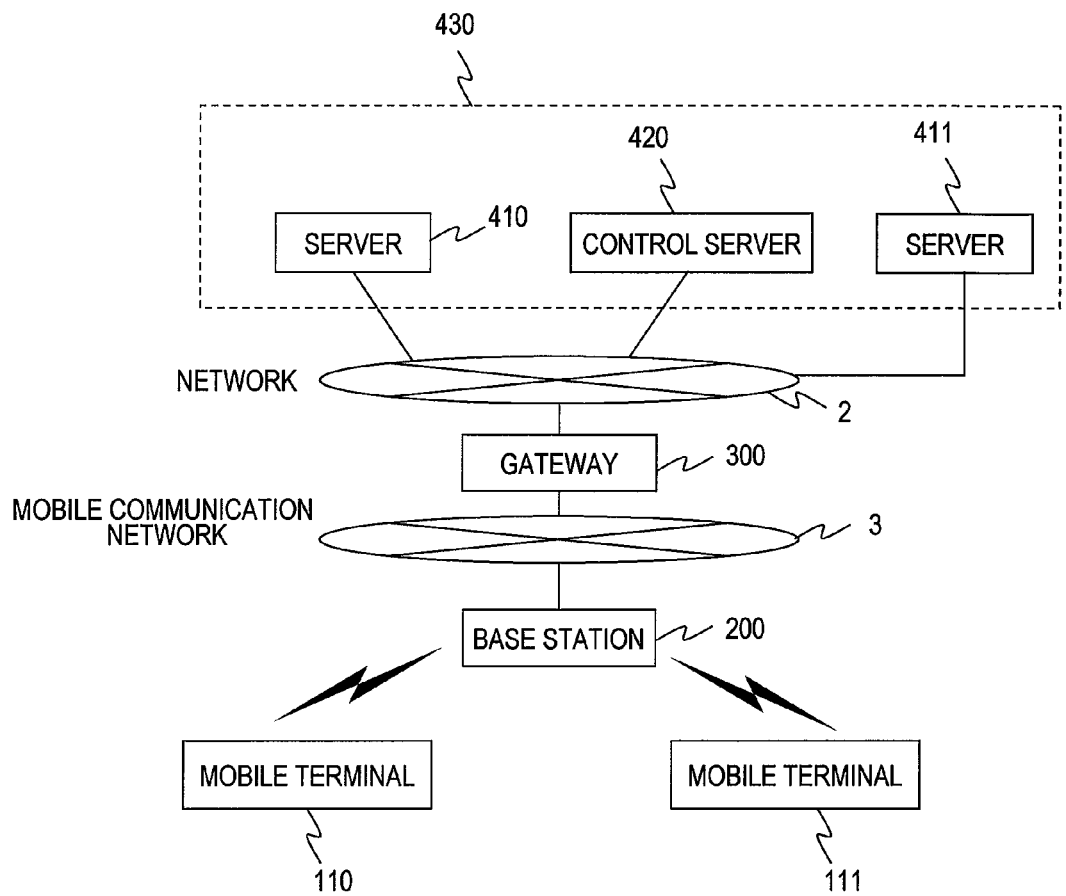
PRIOR ART
FIG. 16
PRIOR ART
FIG. 17

COMMUNICATION SYSTEM AND GATEWAY APPARATUS

CLAIM OF PRIORITY

The present application claims priority from Japanese patent application JP 2008-327934 filed on Dec. 24, 2008, the content of which is hereby incorporated by reference into this application.

BACKGROUND OF THE INVENTION

This invention relates to a communication system, and more particularly, to a communication system that guarantees communication quality.

With broadband networks becoming widespread, there is an increasing demand for new services such as audio/video streaming and a business application running via a network in addition to conventional data communication services typified by downloading of a massive volume of data, Web browsing, and the like. In those new services, so-called communication quality such as in communication speed, delay of data, and jitter of the delay is required to achieve a predetermined level of quality in order to provide a service with stable quality.

In addition, due to the need for advancing diversification and globalization of data communication services, reducing costs necessary for data communication services, and early recovery of data communication services upon occurrence of a disaster, a distributed system configuration as illustrated in FIG. 15 is becoming mainstream as a method of arranging servers for providing the data communication services.

FIG. 15 is a block diagram illustrating a distributed system according to a conventional technology.

The distributed system according to the conventional technology includes a terminal 100, a terminal 101, an access network 1, a gateway 300, a network 2, and a server group 430.

The terminal 100 and the terminal 101 are connected to the access network 1 that is a communication network constituting communication means used by the terminal 100 and the terminal 101. The terminal 100 and the terminal 101 are each a computer including a processor, an output device, an input device, a network interface, a memory, and an auxiliary storage device. Further, not only such two terminals as the terminal 100 and the terminal 101 but also a plurality of terminals having the same configuration are connected to the access network 1. The access network 1 is, for example, a mobile communication network or an optical communication network.

The access network 1 is connected to the network 2 externally via the gateway 300.

The gateway 300 is an interface between the access network 1 and the network 2. The gateway 300 is a computer including a processor, an output device, an input device, a network interface, a memory, and an auxiliary storage device. The gateway 300 manages, for example, connection information and transfer information on a packet exchanged between the access network 1 and the network 2. In addition, the gateway 300 collects accounting charged for the terminal 100 and the terminal 101.

The network 2 is, for example, the Internet, a network built by a communications carrier, or a network built by a corporation or the like on its own.

The server group 430 is a cluster of servers arranged in a distributed manner. The server group 430 includes a control server 420 and a plurality of servers.

A server 410 and a server 411 are the servers arranged in the server group 430 in a distributed manner. The server 410 and the server 411 are each a computer including a processor, an output device, an input device, a network interface, a memory, and an auxiliary storage device. In addition, the server 410 and the server 411 each include an application program and a storage device, and provide a service to users of the terminals.

The control server 420 is a computer including a processor, an output device, an input device, a network interface, a memory, and an auxiliary storage device. If the terminal 100 or the terminal 101 issues a request to use the service, the control server 420 decides on a connected server from within the server group 430 based on loaded conditions of the respective servers, and notifies the terminal that has issued the request to use the service of the connected server that has been decided on.

Hereinafter, a background technology is described by referring to FIG. 16 that illustrates a network configuration in a case of using a mobile communication network 3 as the access network 1.

FIG. 16 is a block diagram illustrating a distributed system according to the conventional technology which uses a mobile communication network.

The distributed system that uses the mobile communication network includes a mobile terminal 110, a mobile terminal 111, a base station 200, the mobile communication network 3, the gateway 300, the network 2, and the server group 430. The gateway 300, the network 2, and the server group 430 are the same as the gateway 300, the network 2, and the server group 430 illustrated in FIG. 15.

The mobile terminal 110 and the mobile terminal 111 are each a computer including a processor, an output device, an input device, a network interface, a memory, and an auxiliary storage device. The mobile terminal 110 and the mobile terminal 111 are each connected to the mobile communication network 3 via the base station 200.

The base station 200 is a computer including a processor, an output device, an input device, a network interface, a memory, and an auxiliary storage device. The base station 200 converts packets transmitted from the mobile communication network 3 into radio signals, and transmits the radio signals to the mobile terminal 110 and the mobile terminal 111. In addition, the base station 200 converts radio signals transmitted from the mobile terminal 110 and the mobile terminal 111 into packets, and transmits the packets to the mobile communication network 3.

The mobile communication network 3 is connected to a plurality of base stations (in FIG. 16, the number of base stations is one) and the gateway 300, and transfers the packets between the base station 200 and the gateway 300.

For example, in the distributed system illustrated in FIG. 16, in a case where the mobile terminal 110 uses a new service, such as audio/video streaming or a business application running via the network 2, through the server 410, the mobile communication network 3 and the network 2 need to be controlled so that communications between the mobile terminal 110 and the server 410 may achieve predetermined quality.

Therefore, in the distributed system according to the conventional technology, RTP/RTCP and UDP protocols are implemented on the base station 200 as disclosed in, for example, WO 2005/027394 A1. By adding a technique disclosed in WO 2005/027394 A1, the base station 200 uses the RTP/RTCP and UDP protocols to analyze a signal transmitted between the server 410 (which is a fixed terminal in WO 2005/027394 A1 and the mobile terminal 110 and to measure communication quality between the base station 200 and the server 410, in other words, in the mobile communication network 3. The base station 200 uses the communication quality to calculate communication quality to be achieved between the base station 200 and the mobile terminal 110 and to adjust a transmission parameter of a wireless zone (between the base station 200 and the mobile terminal 110).

As conventional adjustment of a transmission parameter, there is exemplified priority control performed in the wireless zone as disclosed in, for example, JP 2007-053548 A.

FIG. 17 is an explanatory diagram illustrating a correspondence of priority indicators between the network and the wireless zone according to the conventional technology.

As illustrated in FIG. 17, in the system of JP 2007-053548 A, the base station 200 sets up a priority of a packet in the wireless zone according to priority indicators "A" through "D" in the network 1 and priority indicators "a" through "d" in the wireless zone, which are previously defined, and transmits the packet to the terminal via the wireless zone according to the priority indicator in the wireless zone. For example, the packet having the priority indicator "B" as a priority in the network 1 is given the priority indicator "b" as a priority in the wireless zone by the base station 200, and is transmitted to the terminal.

SUMMARY OF THE INVENTION

There are two objects to be achieved by this invention.

First, according to the method disclosed in WO 2005/027394 A1, it is necessary to provide the base station 200 with the protocol such as the RTP/RTCP or UDP protocol. Those protocols are unnecessary for a function originally required for the base station 200, in other words, a function of converting the packet transmitted in the mobile communication network 3 into a radio signal. Therefore, the addition of the protocol such as the RTP/RTCP or UDP protocol makes it more complicated to implement the base station. The first object is to avoid making the base station more complicated as described above.

Second, in the system configuration illustrated in FIG. 15, for example, the following situation occurs. There is a case where the terminal 100 and the terminal 101 use the same service, the terminal 100 receives an instruction for a connection to the server 410 from the control server 420 at the start of the service, and the terminal 101 receives an instruction for a connection to the server 411 from the control server 420 at the start of the service. Then, the terminal 100 communicates with the server 410 via the gateway 300, and the terminal 101 communicates with the server 411 via the gateway 300. Further, the server 410 exists at a location physically near a position at which the gateway 300 exists, while the server 411 exists at a location physically far therefrom.

In a general communication system, it is thought that communication quality that can be achieved improves in communications between devices that exist in a physically short distance much more than in communications between devices that exist across a physically long distance. In a case where a delay time is taken as an example of the communication quality, the delay time of the communications between devices that exist in the physically short distance is small, and the delay time of the communications between devices that exist across the physically long distance is large.

As described above, in the example illustrated in FIG. 15, it is expected that the delay time required for the communications between the gateway 300 and the server 410 is smaller than the delay time required for the communications between the gateway 300 and the server 411.

However, in order for the terminal 100 and the terminal 101 to use the same service, the delay times required for the communications between the terminal 100 and the server 410 and between the terminal 101 and the server 411 must be of equal communication quality. It should be noted that the delay time of communications between each terminal and each server is a sum of the delay time of communications between each terminal and the gateway 300 and the delay time of communications between the gateway 300 and each server.

Therefore, in the above-mentioned example illustrated in FIG. 15, in consideration of the above-mentioned relationship regarding the delay time of the communications between the gateway 300 and each server, the delay time of communications between the terminal 101 and the gateway 300 needs to be smaller than the delay time of communications between the terminal 100 and the gateway 300.

In the system in which the servers are thus arranged in a distributed manner, in order to make the communication quality between the terminal and the server constant, the communication quality between the gateway 300 and the terminal, in other words, the communication quality in the access network 1 needs to be controlled individually on a terminal basis based on the communication quality between the gateway 300 and each server, in other words, the communication quality in the network 2.

However, in the method disclosed in JP 2007-053548 A, such a table as illustrated in FIG. 17 is used to convert the priority not individually on a terminal basis but on a service basis. Therefore, the second object is to solve such a problem that the communication quality in the access network cannot be controlled individually on a terminal basis by the method disclosed in JP 2007-053548 A.

A representative aspect of this invention is as follows. That is, there is provided a communication system, comprising at least one computer and a gateway that is connected to the at least one computer through a first network. The gateway is connected to at least one terminal through a second network. The at least one terminal performs communications with the at least one computer via the gateway. The gateway estimates quality of the communications between the gateway and the at least one computer in the first network; and determines a priority for the communications between the gateway and the at least one terminal in the second network according to the estimated quality of the communications in the first network.

According to the embodiment of this invention, it is possible to control the communication quality on the terminal basis without making the base station more complicated.

BRIEF DESCRIPTION OF THE DRAWINGS

The present invention can be appreciated by the description which follows in conjunction with the following figures, wherein:

FIG. 1 is a block diagram illustrating a system according to a first embodiment of this invention;

FIG. 2 is a sequential diagram illustrating a processing flow of the first embodiment of this invention;

FIG. 3 is a block diagram illustrating a configuration of a gateway according to the first embodiment of this invention;

FIG. 4 is a flowchart illustrating a first example of a network communication quality measurement method according to the first embodiment of this invention;

FIG. 5 is an explanatory diagram illustrating a relationship between the distance and communication quality between the gateway and a server according to the first embodiment of this invention;

FIG. 6 is a flowchart illustrating a second example of a network communication quality measurement method according to the first embodiment of this invention;

FIG. 7 is an explanatory diagram illustrating a relationship between the result of the command and the communication quality according to the first embodiment of this invention;

FIG. 8 is an explanatory diagram illustrating a relationship between the estimation result of the communication quality of the network and the priority indicator according to the first embodiment of this invention;

FIG. 9 is an explanatory diagram illustrating a relationship among a terminal ID, a session ID, and the priority indicator according to the first embodiment of this invention;

FIG. 10 is a block diagram illustrating a system configuration according to a second embodiment of this invention;

FIG. 11 is a sequential diagram illustrating a processing flow of the second embodiment of this invention;

FIG. 12 is a block diagram illustrating a configuration of a gateway according to the second embodiment of this invention;

FIG. 13 is a block diagram illustrating a configuration of a base station according to the second embodiment of this invention;

FIG. 14 is an explanatory diagram illustrating a relationship among a mobile terminal ID, the priority indicator in the network, and the priority indicator in the wireless zone according to the second embodiment of this invention;

FIG. 15 is a block diagram illustrating a conventional distributed system;

FIG. 16 is a block diagram illustrating a conventional distributed system; and

FIG. 17 is an explanatory diagram illustrating a correspondence of priority indicators between the network and the wireless zone according to the conventional technology.

DETAILED DESCRIPTION OF THE PREFERRED EMBODIMENTS

First Embodiment

A first embodiment of this invention is described by referring to a system configuration diagram of FIG. 1.

FIG. 1 is a block diagram illustrating a system according to the first embodiment of this invention.

The system of the first embodiment includes a terminal 100, a terminal 101, an access network 1, a gateway 302, a network 2, a server group 430, a server 410, a server 411, a control server 420, a session control server 500, and a user information control server 501.

Components of the system of the first embodiment which have the same functions and configurations as those of the distributed system according to the conventional technology illustrated in FIG. 15 are denoted by the same reference numerals.

The gateway 302 is an interface between the access network 1 and the network 2, and is a gateway according to the first embodiment. The gateway 302 is a computer including a processor, an output device, an input device, a network interface, a memory, and an auxiliary storage device.

The session control server 500 allocates a server to a terminal when the terminal issues a request for a connection to a session to the server. The session control server 500 may use, for example, an SIP server.

The user information control server 501 retains information on a user, and according to the request received from the gateway 302, transmits the information on the user of the terminal 100 or the terminal 101 to the gateway 302. The user information control server 501 may be, for example, a server having a home subscriber server (HSS) function according to 3GPP. In addition, the information on the user retained by the user information control server 501 may include, for example, so-called subscriber information such as a bandwidth and a service that can be used by the user.

FIG. 2 illustrates a processing performed in a case where the terminal 100 uses a service provided by the server group 430 in the system illustrated in FIG. 1.

FIG. 2 is a sequential diagram illustrating a processing flow of the first embodiment of this invention.

The terminal 100 executes a service initiation process 700 for starting the service using the server group 430 between the terminal 100 and the control server 420. Information transmitted to the terminal 100 by the service initiation process 700 includes, for example, a service initiation request issued by the terminal 100 and information on the server to be used by the terminal 100, which is specified by the control server 420. In this embodiment, as a result of the service initiation process 700, the control server 420 specifies that the terminal 100 is to be connected to the server 410.

Subsequently, the terminal 100 transmits a session connection request 701 to the session control server 500.

Upon reception of the session connection request 701, the session control server 500 transmits to the gateway 302 a resource request 702 for requesting a resource to be secured in the access network 1.

Upon reception of the resource request 702, the gateway 302 transmits to the user information control server 501 a user information request 703 for requesting the information on the user who has executed the service initiation process 700 by using the terminal 100.

Upon reception of the user information request 703, the user information control server 501 selects the information on the user requested in the user information request 703 from among pieces of the user information included in the user information control server 501 and transmits the selected information on the user as a user information response 704 to the gateway 302.

Upon reception of the user information response 704, the gateway 302 executes a user information authentication step 705. In the user information authentication step 705, the gateway 302 confirms whether or not the user of the terminal 100 can use the resource requested in the resource request 702.

In this embodiment, if the user of the terminal 100 is not entitled to access the resource, the gateway 302 responds to the session control server 500 that the resource requested by the resource request 702 cannot be secured.

Hereinafter, description is made of a case where the user of the terminal 100 can use the resource requested by the resource request 702 in the user information authentication step 705.

Subsequently, the gateway 302 executes a network communication quality evaluation step 706 of measuring communication quality of the network 2. A method of measuring the communication quality of the network 2 is described later.

Subsequently, the gateway 302 executes a priority indicator setup step 707 by using the communication quality of the network 2 measured in the network communication quality evaluation step 706, and sets up a priority indicator in the access network 1 of a packet to be communicated through the session, the connection to which has been requested by the terminal 100 in the session connection request 701. A method of setting up the priority indicator is described later.

Subsequently, the gateway 302 executes a priority indicator update step 708 by using the priority indicator that has been set up in the priority indicator setup step 707, and updates the priority indicator of the packet to be communicated through the session, the connection to which has been requested by the terminal 100 in the session connection request 701. Details of the updated settings are described later.

Subsequently, the gateway 302 transmits the resource that can be allocated to the terminal 100 to the session control server 500 as a resource response 709.

Upon reception of the resource response 709, the session control server 500 transmits to the terminal 100 a session connection response 710 for notifying the terminal 100 that a session connection can be established.

Upon reception of the session connection response 710, the terminal 100 uses the session, the connection to which has been requested in the session connection request 701 and made ready in the session connection response 710 to thereby perform communications between the terminal 100 and the server 410 and executes the service (service execution 711).

FIG. 3 is a block diagram illustrating a configuration of the gateway 302 according to the first embodiment of this invention.

The gateway 302 includes a network interface 310, a resource allocation controller 320, a user information controller 340, a network communication quality measurement part 350, a priority indicator controller 360, a packet transfer part 370, and an access network interface 330.

The network interface 310 is an interface between the gateway 302 and the network 2. The network interface 310 is used when such a transmission/reception as illustrated in FIG. 2 is performed between the gateway 302 and the session control server 500 or the user information control server 501. In addition, the network interface 310 is used when the packet to be transmitted/received between the terminal 100 and the control server 420 or the server 410 is transferred between the network 2 and the access network 1. The network interface 310 includes, for example, a physical interface such as Ethernet (registered trademark, the same shall apply hereinafter), and is the interface for performing communications via a protocol such as TCP/IP.

The access network interface 330 is an interface between the gateway 302 and the access network 1. The access network interface 330 is used for the communication between the gateway 302 and the terminal 100 or the terminal 101.

The resource allocation controller 320 executes the protocol defined between the gateway 302 and the session control server 500. The resource allocation controller 320 processes messages of the resource request 702 and the resource response 709 in the processing flow illustrated in FIG. 2.

The user information controller 340 executes the protocol defined between the gateway 302 and the user information control server 501. The user information controller 340 processes messages of the user information request 703 and the user information response 704, and executes the user information authentication step 705 in the processing flow illustrated in FIG. 2.

The network communication quality measurement part 350 executes the network communication quality evaluation step 706 in the processing flow illustrated in FIG. 2, and outputs an evaluation result of the communication quality obtained in the network communication quality evaluation step 706 to the priority indicator controller 360. Two examples of a method of evaluating the communication quality of the network are described below.

FIG. 4 is a flowchart illustrating the first example of a network communication quality measurement method according to the first embodiment of this invention.

In a step 351 for server location estimation, the network communication quality measurement part 350 uses information on the connected server (in FIG. 2, server 410) for the terminal 100 to estimate the location of the connected server for the terminal 100. The information on the connected server for the terminal 100 is contained in the resource request 702.

If the network 2 is, for example, an IP network, the network communication quality measurement part 350 may estimate a physical location of the connected server for the terminal 100 based on an IP address of the connected server for the terminal 100. As a method of acquiring physical location information based on the IP address, a table in which the IP address and the physical location information are previously stored in association with each other may be included in the network communication quality measurement part 350, or a mapping service for the IP address and the location information which is provided via the network 2 may be used.

Further, as a method of estimating the location of the connected server for the terminal 100 in the step 351 for server location estimation, there may be exemplified a method in which the gateway 302 acquires the location of the server within the server group 430 which is previously saved by an administrator to any one of the servers that are connected to the network 2.

Subsequently, in a step 352 of estimating communication quality based on the server location, the network communication quality measurement part 350 estimates the communication quality between the gateway 302 and the connected server for the terminal 100 based on the location information of the connected server for the terminal 100 estimated in the step 351.

As a method of estimating communication quality in this embodiment there is exemplified estimating the communication quality according to a distance between the gateway 302 and the connected server as illustrated in FIG. 5.

FIG. 5 is an explanatory diagram illustrating a relationship between the distance and communication quality between the gateway 302 and the connected server according to the first embodiment of this invention.

The network communication quality measurement part 350 previously sets a plurality of thresholds regarding the distance (in FIG. 5, three thresholds are set so that D1<D2<D3). The network communication quality measurement part 350 estimates the communication quality (in the example of FIG. 5, four types NQ1 through NQ4) of the network according to the relationship between the distance between the gateway 302 and the connected server and the plurality of thresholds. In a case where a delay time is used as an example of the communication quality, NQ1 indicates that the delay time is smallest between the gateway 302 and the connected server (in other words, the communication quality is good), while NQ4 indicates that the delay time is largest between the gateway 302 and the connected server (in other words, the communication quality is poor).

FIG. 6 is a flowchart illustrating the second example of the network communication quality measurement method according to the first embodiment of this invention.

The network communication quality measurement part 350 issues a command capable of measuring the communication quality to the connected server (in the example of FIG. 2, server 410) for the terminal 100, and acquires a result of the command capable of measuring the communication quality. For example, if the network 2 is an IP network, the network communication quality measurement part 350 included in the gateway 302 executes a ping command with respect to the connected server (step 353 of executing a command for communication quality estimation), and measures the delay time between the gateway 302 and the connected server.

Subsequently, in a step 354 of estimating communication quality based on the command result, the network communication quality measurement part 350 estimates the communication quality between the gateway 302 and the connected servers based on the result obtained in the step 353 of executing the command for communication quality estimation.

FIG. 7 is an explanatory diagram illustrating a relationship between the result of the command and the communication quality according to the first embodiment of this invention.

Specifically, a plurality of thresholds regarding the result of the command used in the step 353 of executing the command for communication quality estimation are previously set (in FIG. 7, three thresholds are set so that R1<R2<R3). In addition, the network communication quality measurement part 350 estimates the communication quality (in the example of FIG. 7, four types NQ1 through NQ4) according to the relationship between the result of the command issued in the step 353 of executing the command for communication quality estimation and the plurality of thresholds described above.

If the ping command is issued in the step 353 of executing the command for communication quality estimation, R1 through R3 represent the thresholds for the delay time between the gateway 302 and the connected server. Further, NQ1 indicates that the delay time is smallest between the gateway 302 and the connected server (in other words, the communication quality is good), while NQ4 indicates that the delay time is largest between the gateway 302 and the connected server (in other words, the communication quality is poor).

The network communication quality measurement part 350 outputs the measurement result obtained by the above-mentioned network communication quality measurement method to the priority indicator controller 360.

Based on the measurement result of the communication quality input from the network communication quality measurement part 350, the priority indicator controller 360 sets up the priority indicator in the access network 1 which is to be added to the packet in the session, the connection to which has been requested in the session connection request 701, and the decided priority indicator that has been set up is set in the packet transfer part 370.

FIG. 8 is an explanatory diagram illustrating a relationship between the estimation result of the communication quality of the network 2 and the priority indicator in the access network 1 according to the first embodiment of this invention.

As a method of setting up the priority indicator, there is used a method of setting up the priority indicator by using a table illustrated in FIG. 8 in such a manner that the priority indicator in the access network 1 is set up as AP1 if the communication quality in the network is NQ1. NQ1 through NQ4 illustrated in FIG. 8 are the same as the measurement results of the communication quality input from the network communication quality measurement part 350, and in the same manner as the measurement results illustrated in FIG. 5 and FIG. 7, NQ1 indicates that the communication quality is best, while NQ4 indicates that the communication quality is worst.

In a case where the same service is executed, in order to keep the communication quality between the terminal and the server to constant level, the priority indicator controller 360 needs to set a priority in the access network 1 higher if the communication quality of the network 2 is worse, and conversely needs to set the priority in the access network 1 lower if the communication quality of the network 2 is better. Therefore, in the case of FIG. 8, the priority indicator controller 360 sets AP1 that is the priority indicator in the access network 1 lowest, and sets AP4 highest.

Subsequently, the priority indicator controller 360 sets the priority indicator in the access network 1 that has been set up in the above-mentioned processing in the packet transfer part 370.

FIG. 9 is an explanatory diagram illustrating a relationship among a terminal ID, a session ID, and the priority indicator according to the first embodiment of this invention.

The packet transfer part 370 includes a table illustrated in FIG. 9, and in association with an ID appended to each terminal and an ID of the session to which the terminal is connected, manages the priority indicator in the access network 1 of the packet transmitted by the session. The priority indicator controller 360 sets the priority indicator in the access network 1 that has been set up by the above-mentioned procedure in the table of FIG. 9 in association with the terminal ID and the session ID.

The packet transfer part 370 transfers the packet exchanged between the network 2 and the access network 1 in a two-way manner. The packet transfer part 370 updates the priority indicator contained in a header of the packet based on settings illustrated in FIG. 9. For example, in a case where the packet exchanged between the network 2 and the access network 1 is an IP packet with a TOS field within the IP header being used for the priority indicator in the network 2, the packet transfer part 370 updates the TOS field of the packet based on the settings illustrated in FIG. 9. As an alternative example, in a case of using a unique header in the access network 1, the packet transfer part 370 updates a field within the unique header corresponding to the priority indicator.

Further, when transferring the packet to the network 2 or the access network 1, the packet transfer part 370 may transfer the packet according to the priority indicator in an access network illustrated in FIG. 9.

It should be noted that in the system of the first embodiment of this invention, the server 410 and the server 411 may be replaced by a plurality of storage devices, and the server group 430 may be set as a storage device group.

The above description is made of the first embodiment of this invention by taking the example of the communications performed between the terminals 100 and 101 and the servers 410 and 411, respectively, but the first embodiment described above may be applied to communications performed by the terminals 100 and 101 in order to access storage areas provided by storage devices which are installed in place of the servers.

As described above, according to the first embodiment of this invention, the gateway 302 can control the communication quality between the terminal and the server so as to remain constant without the addition of a new protocol or a protocol unnecessary for the function of the gateway 302. Further, as illustrated in FIG. 9, by managing the priority indicator on a terminal basis and a session basis, the gateway 302 can individually control the communication quality of the access network 1 on a terminal basis.

Second Embodiment

Next, a second embodiment of this invention is described.

FIG. 10 is a block diagram illustrating a system configuration according to the second embodiment of this invention.

In FIG. 10, components having the same functions and configurations as those in FIG. 1 and FIG. 16 are denoted by the same reference numerals. A gateway 301 and a base station 201 have the same functions as the gateway 300 and the base station 200 illustrated in FIG. 16, respectively. In addition, the gateway 301 and the base station 201 perform a processing according to the second embodiment as described below.

First, the processing performed in a case where a mobile terminal 110 uses the service provided by the server group 430 is described in the second embodiment.

FIG. 11 is a sequential diagram illustrating a processing flow of the second embodiment of this invention.

In FIG. 11, components having the same configurations, the same messages, and the same operations as those in FIG. 2 are denoted by the same reference numerals. In the second embodiment, a flow from the service initiation process 700 through the priority indicator setup step 707 and a flow from the resource response 709 through the service execution 711 are the same as those in the first embodiment, and description thereof is omitted.

The gateway 301 transmits a priority indicator update request 750 to the base station 201 to thereby transmit the priority indicator set up in the priority indicator setup step 707 to the base station 201.

FIG. 12 is a block diagram illustrating a configuration of the gateway 301 according to the second embodiment of this invention.

In FIG. 12, components having the same configurations and functions as those in FIG. 3 are denoted by the same reference numerals, in other words, the components other than a priority indicator controller 361 are denoted by the same reference numerals. In FIG. 12, the priority indicator controller 361 transmits the priority indicator in a wireless zone (zone between the base station 201 and the mobile terminal 110 and between the base station 201 and a mobile terminal 111) that has been set up to the base station 201 via the access network interface 330 and a mobile communication network 3.

In a priority indicator update step 758, the base station 201 sets the priority indicator in the wireless zone specified by the priority indicator update request 750 as the priority in the wireless zone regarding the mobile terminal 110.

FIG. 13 is a block diagram illustrating a configuration of a base station according to the second embodiment of this invention.

An interface 210 is an interface used by the base station 201 in order to communicate with the gateway 301 and the like via the mobile communication network 3. A transmitter and receiver part 220 performs so-called baseband signal processings such as modulation/demodulation and error correction coding/decoding that are necessary for communications between the base station and the terminal. A radio interface 240 is an interface between a high-frequency signal transmitted/received as a radio signal and a baseband signal processed by the transmitter and receiver part 220. An antenna 250 receives the radio signal transmitted from the mobile terminal 110 and the mobile terminal 111 and to be processed by the radio interface 240, and transmits the radio signal processed by the radio interface 240 to the mobile terminal 110 and the mobile terminal 111.

A scheduler 230 schedules transmission/reception of the packet of each terminal based on the priority indicator in the wireless zone specified in the priority indicator update request 750. FIG. 14 illustrates an example of a table of the priority indicator managed by the scheduler 230 in order to schedule the transmission/reception of the packet.

FIG. 14 is an explanatory diagram illustrating a relationship among a mobile terminal ID, the priority indicator in the network, and the priority indicator in the wireless zone according to the second embodiment of this invention.

The priority indicator in the wireless zone is managed in association with the mobile terminal ID and the priority indicator in the network 2 of the packet on a mobile terminal basis. In the case where the network 2 is an IP network, the priority indicator in the network 2 may be specified by, for example, a value of the TOS field contained in the IP packet. In the priority indicator update step 758, the scheduler 230 updates the priority indicator in the wireless zone associated with the mobile terminal ID (ID corresponding to the mobile terminal 110 illustrated in FIG. 10) and the priority indicator in the network 2, to the priority indicator specified by the priority indicator update request 750.

As described above, according to the second embodiment, it becomes possible to control the communication quality between the mobile terminal and the server so as to remain constant without adding a protocol to the base station 201 and the gateway 301. Further, as illustrated in FIG. 14, by managing the priority indicator in the wireless zone on a terminal basis, it becomes possible to individually control the communication quality of the mobile communication network on a terminal basis.

While the present invention has been described in detail and pictorially in the accompanying drawings, the present invention is not limited to such detail but covers various obvious modifications and equivalent arrangements, which fall within the purview of the appended claims.

What is claimed is:

1. A communication system, comprising:
at least one computer in a first network; and
a gateway that is connected to the at least one computer through the first network, wherein:
the gateway is connected to at least one terminal in a second network through the second network;
the at least one terminal is configured to perform communications with the at least one computer via the gateway; and
the gateway is configured to:
obtain an evaluation result about the at least one computer providing service to the at least one terminal without using a packet transmitted from the at least one computer to the at least one terminal in a case where the at least one terminal sends a request packet to provide the service;
estimate a quality of the communications in the first network between the gateway and the at least one computer in the first network based on the obtained evaluation result related to the at least one computer;
determine a priority for the communications between the gateway and the at least one terminal in the second network according to the estimated quality of the communications in the first network;
obtain an address of the at least one computer as the evaluation result related to the at least one computer;
estimate the quality of the communications in the first network based on the address of the at least one computer and predetermined location information; and
determine that the priority for the communications performed between the gateway and the at least one terminal in the second network is high in a case where the estimated quality of the communications in the first network is low.

2. The communication system according to claim 1, wherein:
the at least one computer comprises a storage device for providing a storage area; and the gateway is configured to estimate the quality of the communications between the gateway and the storage device in the first network.

3. The communication system according to claim 1, wherein the gateway is further configured to:
obtain information on a distance between the gateway and the at least one computer;
estimate the quality of the communications in the first network based on the information on the distance; and
determine that the priority for the communications performed between the gateway and the at least one terminal in the second network is high in a case where the estimated quality of the communications in the first network is low.

4. The communication system according to claim 1, wherein the gateway is further configured to:
issue a command to the at least one computer for estimating the quality of the communications in the first network in order to obtain another evaluation result related to the at least one computer; and
determine that the priority order for the communications performed between the gateway and the at least one terminal in the second network is high in a case where a result of the execution of the command indicates that the quality of the communications in the first network is low.

5. The communication system according to claim 1, wherein the gateway is further configured to:
update data of a priority area which is contained in a packet used for the communications with the at least one terminal according to the determined priority that has been set up; and
use the packet containing the priority area representing the updated priority for the communications with the at least one terminal.

6. The communication system according to claim 1, wherein:
the gateway is connected to at least one base station;
the second network comprises:
the at least one base station;
the at least one terminal; and
a wireless network;
the at least one base station is connected to the at least one terminal through the wireless network;
the at least one terminal is configured to perform the communications with the at least one computer via the at least one base station and the gateway; and
the gateway is configured to determine the priority for the communications between the at least one base station and the at least one terminal in the wireless network according to the estimated quality of the communications in the first network.

7. The communication system according to claim 6, wherein:
the gateway is configured to transmit the priority determined for the communications in the wireless network to the at least one base station; and
the at least one base station is configured to perform the communications with the at least one terminal according to the transmitted priority.

8. A gateway apparatus connected to at least one computer through a first network and connected to at least one terminal in a second terminal through the second network, the at least one terminal is configured to perform communications with the at least one computer via the gateway apparatus,
wherein the gateway apparatus is configured to:
obtain an evaluation result about the at least one computer providing service to the at least one terminal without using a packet transmitted from the at least one computer to the at least one terminal in a case where the at least one terminal sends a request packet to provide the service;
estimate a quality of the communications in the first network between the gateway apparatus and the at least one computer in the first network based on the obtained evaluation result related to the at least one computer;
determine a priority for the communications between the gateway apparatus and the at least one terminal in the second network according to the estimated quality of the communications in the first network;
obtain an address of the at least one computer;
estimate the quality of the communications based on the address of the at least one computer and predetermined location information; and
determine that the priority order for the communications performed between the gateway apparatus and the at least one terminal in the second network is high in a case where the estimated quality of the communications in the first network is low.

9. The gateway apparatus according to claim 8, wherein:
the at least one computer comprises a storage device for providing a storage area; and
the gateway apparatus is configured to estimate the quality of the communications between the gateway apparatus and the storage device in the first network.

10. The gateway apparatus according to claim 8, wherein the gateway apparatus is further configured to:
obtain information on a distance between the gateway apparatus and the at least one computer;
estimate the quality of the communications in the first network based on the information on the distance; and
determine that the priority order for the communications performed between the gateway apparatus and the at least one terminal in the second network is high in a case where the estimated quality of the communications in the first network is low.

11. The gateway apparatus according to claim 8, wherein the gateway apparatus is further configured to:
issue a command to the at least one computer for estimating the quality of the communications in the first network in order to obtain another evaluation result related to the at least one computer; and
determine that the priority order for the communications performed between the gateway apparatus and the at least one terminal in the second network is high in a case where a result of the execution of the command indicates that the quality of the communications in the first network is low.

12. The gateway apparatus according to claim 8, wherein the gateway apparatus is further configured to:
update data of a priority area which is contained in a packet used for the communications with the at least one terminal according to the determined priority that has been set up; and
use the packet containing the priority area representing the updated priority for the communications with the at least one terminal.

13. The gateway apparatus according to claim 8, wherein:
the gateway apparatus is connected to at least one base station;
the second network comprises:
the at least one base station;
the at least one terminal; and
a wireless network;

the at least one base station is connected to the at least one terminal through the wireless network;

the at least one terminal is configured to perform the communications with the at least one computer via the at least one base station and the gateway apparatus; and the gateway apparatus is configured to determine the priority for the communications between the at least one base station and the at least one terminal in the wireless network according to the estimated quality of the communications in the first network.

14. The gateway apparatus according to claim 13, wherein:

the gateway apparatus is configured to transmit the priority determined for the communications in the wireless network to the at least one base station; and the at least one base station is configured to perform the communications with the at least one terminal according to the transmitted priority.

* * * * *